US012574736B2

(12) United States Patent
Koral et al.

(10) Patent No.: US 12,574,736 B2
(45) Date of Patent: Mar. 10, 2026

(54) DETECTING AND MITIGATING DRIVE-BY HOME Wi-Fi HIJACK ATTACKS

(71) Applicant: AT&T Intellectual Property I, L.P., Atlanta, GA (US)

(72) Inventors: Yaron Koral, Cherry Hill, NJ (US); Shraboni Jana, Danville, CA (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 457 days.

(21) Appl. No.: 17/735,691

(22) Filed: May 3, 2022

(65) Prior Publication Data

US 2023/0362650 A1 Nov. 9, 2023

(51) Int. Cl.
*H04W 12/122* (2021.01)
*H04W 88/16* (2009.01)

(52) U.S. Cl.
CPC .......... *H04W 12/122* (2021.01); *H04W 88/16* (2013.01)

(58) Field of Classification Search
CPC ............................. H04W 12/122; H04W 88/16
See application file for complete search history.

(56) References Cited

U.S. PATENT DOCUMENTS

| | | | | |
|---|---|---|---|---|
| 7,020,476 B2 * | 3/2006 | Day | .................. | H04W 12/08 |
| | | | | 455/456.1 |
| 7,316,031 B2 * | 1/2008 | Griffith | .............. | H04L 63/1425 |
| | | | | 709/224 |
| 7,639,806 B2 * | 12/2009 | Daniels | .................. | H04K 1/00 |
| | | | | 713/168 |
| 7,711,809 B2 * | 5/2010 | Kuan | ................... | H04W 12/12 |
| | | | | 709/224 |
| 10,033,751 B2 * | 7/2018 | Donnelly | ............ | H04L 63/0263 |
| 10,070,263 B1 * | 9/2018 | Kaushik | .............. | H04W 12/104 |
| 10,104,638 B1 * | 10/2018 | Isola | ................... | H04B 17/318 |
| 10,527,709 B2 * | 1/2020 | Yaqub | ...................... | G01S 5/12 |
| 10,785,234 B2 * | 9/2020 | Solow | ................. | H04L 63/1408 |
| 10,945,117 B1 * | 3/2021 | Park | ..................... | H04W 12/06 |
| 11,330,430 B2 * | 5/2022 | Seyvet | ................. | H04M 11/04 |
| 11,516,671 B2 * | 11/2022 | Rajput | .................. | H04W 8/18 |
| 11,546,361 B2 * | 1/2023 | A. K. | .................... | H04L 5/0067 |
| 11,689,912 B2 * | 6/2023 | Nair | ....................... | H04W 8/04 |
| | | | | 455/432.1 |
| 12,160,743 B2 * | 12/2024 | Russell | .................. | H04W 8/18 |

(Continued)

*Primary Examiner* — Michael W Chao
(74) *Attorney, Agent, or Firm* — Hartman & Citrin LLC

(57) ABSTRACT

The concepts and technologies disclosed herein are directed to detecting and mitigating drive-by home WI-FI hijack attacks. According to one aspect, a war driving activity correlation system can obtain a report from a home gateway system. The report can identify a suspicious device attempting to connect to a WI-FI network provided, at least in part, by the home gateway system. The war driving activity correlation system can determine, based upon the report, a route of an attacker who uses the suspicious device. The war driving activity correlation system can send instructions to the home gateway system. The instructions can include the route and can specify one or more mitigation actions to be performed by the home gateway system, such as blacklisting a media access control address associated with the suspicious device. The mitigation action(s) can be based upon one or more policies.

15 Claims, 14 Drawing Sheets

(56)     References Cited

U.S. PATENT DOCUMENTS

| | | | |
|---|---|---|---|
| 2005/0166072 A1* | 7/2005 | Converse ............ | H04L 63/1441<br>726/5 |
| 2013/0040603 A1* | 2/2013 | Stahlberg ............... | H04L 63/14<br>455/410 |
| 2013/0305369 A1* | 11/2013 | Karta .................. | H04L 63/1416<br>726/23 |
| 2016/0255459 A1* | 9/2016 | Sarkar .................. | H04W 12/04<br>455/41.1 |
| 2017/0006052 A1* | 1/2017 | Sheleheda ........... | H04L 63/1416 |
| 2017/0329966 A1* | 11/2017 | Koganti .................. | G06F 21/56 |
| 2017/0339190 A1* | 11/2017 | Epstein .............. | H04L 63/1433 |
| 2018/0091382 A1* | 3/2018 | Dronadula ............. | H04L 43/04 |
| 2018/0288660 A1* | 10/2018 | Honda .................. | H04W 48/16 |
| 2019/0108404 A1* | 4/2019 | Xu .................... | G08B 13/19604 |
| 2019/0174452 A1* | 6/2019 | Lev .......................... | H04W 8/08 |
| 2019/0238538 A1* | 8/2019 | Shaw .................. | H04L 63/0227 |
| 2019/0319951 A1* | 10/2019 | West, III ............. | H04L 63/0876 |
| 2019/0357228 A1* | 11/2019 | Dash ....................... | H04L 5/006 |
| 2021/0058416 A1* | 2/2021 | C ........................... | H04L 67/12 |
| 2021/0282016 A1* | 9/2021 | Mohan ............... | H04L 63/1458 |
| 2022/0030027 A1* | 1/2022 | Venkataramaiah .......................... <br>H04L 63/1425 |  |
| 2022/0232389 A1* | 7/2022 | Watts .................... | H04W 12/08 |
| 2023/0246939 A1* | 8/2023 | Thompson .......... | H04L 41/0843<br>709/224 |
| 2023/0319557 A1* | 10/2023 | Liu .................... | H04W 12/037<br>455/410 |

* cited by examiner

400

BEGIN

402
LEARN SIGNAL MEASUREMENTS OF KNOWN WI-FI DEVICES

404
DETERMINE SIGNAL STRENGTH PATTERN(S) OF WI-FI DEVICES THAT CONNECT TO ACCESS POINTS

406
BASED ON SIGNAL STRENGTH PATTERN(S), IDENTIFY UNFAMILIAR DEVICE (I.E., POTENTIAL ATTACKER DEVICE)

408
END

600

BEGIN

602

OBTAIN REPORTS FROM MALICIOUS DEVICES
ANALYZER MODULES

604

DETERMINE ROUTE OF WAR DRIVER (ATTACKER)
BASED UPON REPORTS

606

CHECK POLICY ENGINE FOR APPLICABLE POLICY;
APPLY POLICY IF FOUND

608

GENERATE INSTRUCTIONS; SEND INSTRUCTIONS
TO HOME GATEWAYS

610

END

800 —

DETECTING AND MITIGATING DRIVE-BY HOME Wi-Fi HIJACK ATTACKS

BACKGROUND

Home WI-FI networks provide Internet access within a home premises, but WI-FI signals often extend beyond the home premises and can be detected from nearby streets and other homes. Attackers use this fact to drive by houses, scan for available WI-FI signals, and access home WI-FI networks unbeknownst to the network owner. This behavior is called war driving.

Home networks carry financial information, health information, and other sensitive information. Also, home networks may have multiple Internet of Things ("IoT") devices that control and monitor various functions (e.g., security systems, door locks, smoke detectors, carbon monoxide detectors, and the like) within the home. Therefore, home networks are a preferred target for attackers. Gaining access to a home network allows an attacker to be closer to sensitive information, closer to controlling IoT and/or other devices, and better positioned to hack into devices connected to the network. For example, attackers who are within signal range of a home router can acquire the home WI-FI network name (i.e., service set identifier "SSID") and try to crack its password. After gaining access, attackers can operate on the network from their drive-by location and establish more permanent access by infecting other devices on the network with the malware they control.

SUMMARY

Concepts and technologies disclosed herein are directed to detecting and mitigating drive-by home WI-FI hijack attacks. According to one aspect of the concepts and technologies disclosed herein, a war driving activity correlation system can include a processor and a memory. The memory can include computer-executable instructions that, when executed by the processor, cause the processor to perform operations. In particular, the war driving activity correlation system can obtain one or more reports from a home gateway system. The report(s) can identify a suspicious device attempting to connect to a WI-FI network provided, at least in part, by the home gateway system. The war driving activity correlation system can determine, based upon the report(s), a route of an attacker who uses the suspicious device attempting to connect to the WI-FI network. The war driving activity correlation system can generate instructions including the route. The war driving activity correlation system can send the instructions to the home gateway system. In some embodiments, the instructions include a mitigation action to be performed by the home gateway system. The mitigation action can include, for example, blacklisting a media access control ("MAC") address associated with the suspicious device. The mitigation action can be determined based upon one or more policies. In some embodiments, the war driving activity correlation system can send the instructions to multiple home gateway systems along the route.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
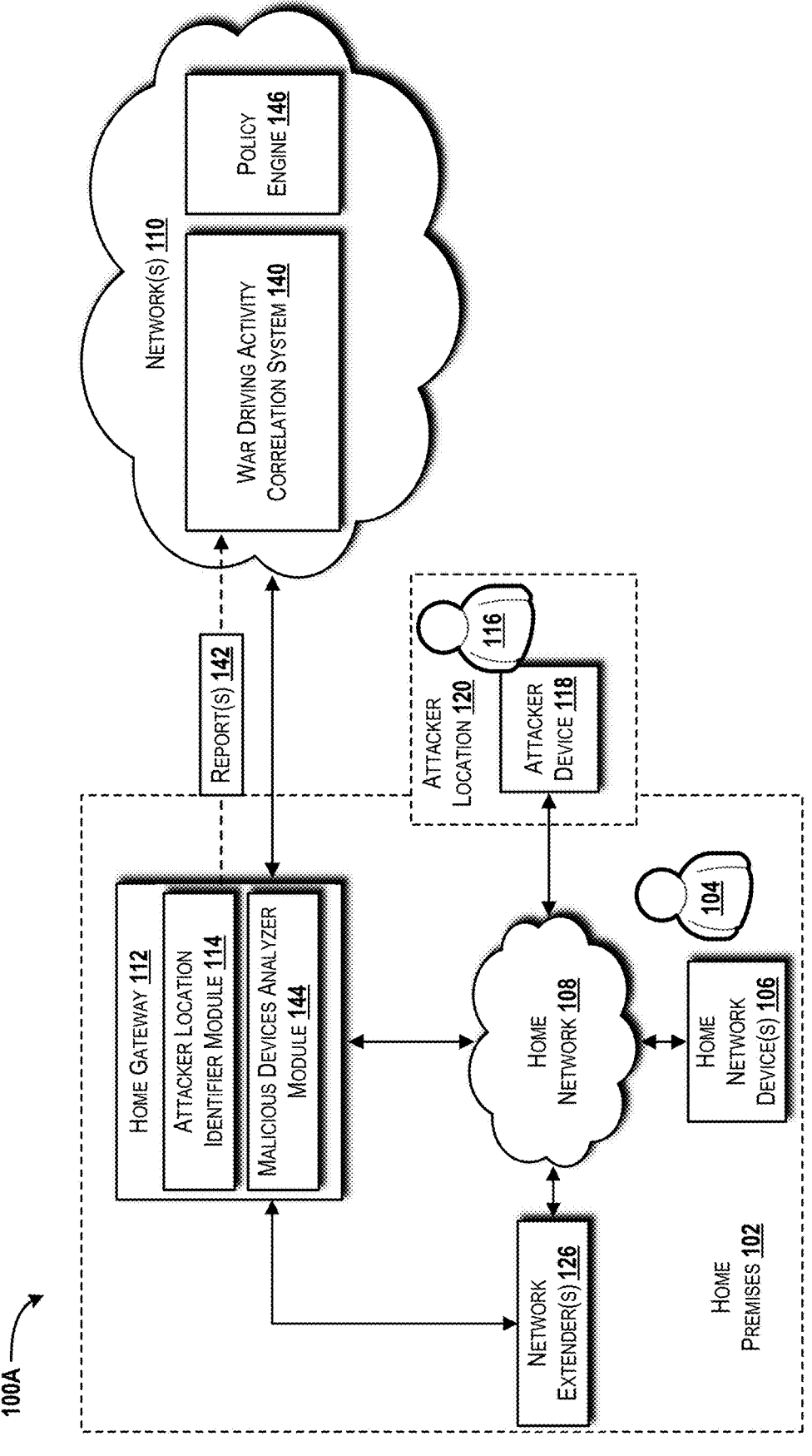
FIGS. 1A-1E are block diagrams illustrating different aspects of an operating environment in which aspects of the concepts and technologies disclosed herein can be implemented.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

The concepts and technologies disclosed herein facilitate detection and protection against war driving actions, thus increasing the security of home WI-FI networks. This capability is valuable to customers presently, and will become increasingly valuable over the next several years as the reliance on home WI-FI networks increases.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for detecting and mitigating drive-by home WI-FI hijack attacks will be described.

Turning now to FIGS. 1A-1E, block diagrams illustrating aspects of operating environments 100A-100E in which aspects of the concepts and technologies disclosed herein can be implemented will be described. It should be understood that the operating environments 100A-100E and the various components thereof have been greatly simplified for purposes of discussion. Accordingly, additional or alternative components of the operating environments 100A-100E can be made available without departing from the embodiments described herein.

The operating environment 100A shown in FIG. 1A includes a home premises 102 in which a user 104 is associated with one or more home network devices 106. The term "home" is used herein to broadly encompass a location in which the user 104 resides at least part time. As such, the home premises 102 can be a primary residence, a secondary residence, an office or other place of business, or any other location that the user 104 defines as their "home." The home premises 102 can include only the structure (e.g., an individual apartment home) or the structure and a surrounding area (e.g., single-family home with a yard).

The home network device(s) 106 can be or can include any computing devices that are capable of operating on and communicating with a home network 108 via a wired or wireless network connection. The home network device(s) 106 can be or can include a computer (best shown in FIG. 7), such as a desktop or laptop personal. The home network device(s) 106 can be or can include a mobile device (best shown in FIG. 8), such as a cellular phone, a feature phone, a smartphone, a mobile computing device, a tablet computing device, a combination thereof, or the like. The home network device(s) 106 can be a media playback device, a set-top box, a video streaming device, a music streaming device, a video game console, a combination thereof, or the like. The home network device(s) 106 can be an IoT device, such as one or more smart home thermostats, lights, cameras, security devices, smoke alarms, carbon monoxide alarms, locks, appliances, and the like.

The home network device(s) 106 can communicate directly with the home network 108 (e.g., via an on-board ethernet and/or WI-FI component). The home network device(s) 106 additionally or alternatively can communicate with the home network 108 through a hub device (not shown), which can communicate with the home network device(s) 106 via a wireless technology such as Institute of Electrical and Electronics Engineers ("IEEE") 802.15.1 (commonly known as BLUETOOTH low energy or BLE), IEEE 802.11ah (HaLow), BLUETOOTH, ZIGBEE, Z-WAVE, other short-range communications technologies, other IoT-specific technologies, combinations thereof, and the like. The home network device(s) 106 can communicate with each other using the same or similar technologies as those described above. It should be understood that as IoT technologies continue to mature, new communications protocols likely will be developed and improve upon existing technologies. The concepts and technologies disclosed herein are not limited to any particular technology(ies). Accordingly, the example technologies described herein should not be construed as being limiting in any way.

The home network 108 can be or can include one or more local area networks ("LANs"), including one or more wireless LANs ("WLANs") operating based on one or more Institute of Electrical and Electronics Engineers ("IEEE") 802.11X standards ("WI-FI"). The home network 108 additionally can include one or more wired/fixed LANs (e.g., ethernet). The home network 108 can communicate with one or more networks 110 via a home gateway 112. The network(s) 110 can be or can include one or more Internet service provider ("ISP") network(s), such as one or more fixed broadband communications networks implemented via fiber optic, coaxial cable, digital subscriber line ("DSL"), broadband over power lines, a combination thereof, and/or the like. The network(s) 110 can facilitate connectivity to other networks, such as the Internet, through which the home network devices 106 can access one or more services (not shown). For example, the service(s) can enable device setup, device registration, remote monitoring, remote control, and/or other interaction with the home network device(s) 106.

The home gateway 112 can be or can include a modem that enables connectivity to the network(s) 110. The home gateway 112 additionally can provide other functionality such as routing, switching, and the like for the home network 108. Aspects of the home gateway 112 can be enabled via firmware, software, hardware, or some combination thereof. In some embodiments, the home gateway 112 operates as a standalone device that is in communication with an existing modem, router, switch, or other network device. In some other embodiments, the home gateway 112 operates as a piggyback device that communicates directly with an existing modem, router, switch, or other network device. The home gateway 112 alternatively may be a proprietary device that provides the functionality described herein.

The home gateway 112 can execute, via one or more processors (best shown in FIG. 7), one or more software modules, including an attacker location identifier module 114. The attacker location identifier module 114 can obtain signal measurements received by the home gateway 112 to estimate the locations of devices connected to the home network 108, including benign devices such as the home network device(s) 106 and potentially malicious devices attempting to gain access to the home network 108. In the illustrated example, an attacker 116 is using an attacker device 118 (i.e., a malicious device) in an attempt to gain access to the home network 108 from an attacker location 120, which can be outside the home premises 102 such as in a nearby street, yard, or other neighboring location. The attacker location identifier module 114 can determine if a given device is situated within the home premises 102 or outside of the home premises 102 such as in a street nearby. The attacker location 120 and the home premises 102 may overlap, at least in part, such as shown in the illustrated example.

The attacker device 118 can be a device similar to one of the home network devices 106. As such, the attacker device 118 can be or can include a computer (best shown in FIG. 7), such as a desktop or laptop personal computer. The attacker device 118 can be or can include a mobile device (best shown in FIG. 6), such as a cellular phone, a feature phone, a smartphone, a mobile computing device, a tablet computing device, a combination thereof, or the like. The attacker device 118 can be a media playback device, a set-top box, a video streaming device, a music streaming device, a video game console, a combination thereof, or the like. The attacker device 118 can be an IoT device, such as one or more smart home thermostats, lights, cameras, security devices, smoke alarms, carbon monoxide alarms, locks, appliances, and the like. The attacker device 118 can be any other device that is capable of connecting to a WI-FI network such as the home network 108.

As a non-limiting example, the home premises 102 will be described herein as a single-family home and the surrounding property associated therewith. The attacker location 120 will be described as somewhere along a street that runs adjacent to the home premises 102. It should be understood, however, that the home premises 102 may instead be a duplex, apartment home, condominium, hotel room, or other similar structure. Accordingly, the attacker location 120 may be elsewhere, such as inside a hotel but not in a particular hotel room or within an apartment complex but not in a particular apartment home.

Figure 1B:
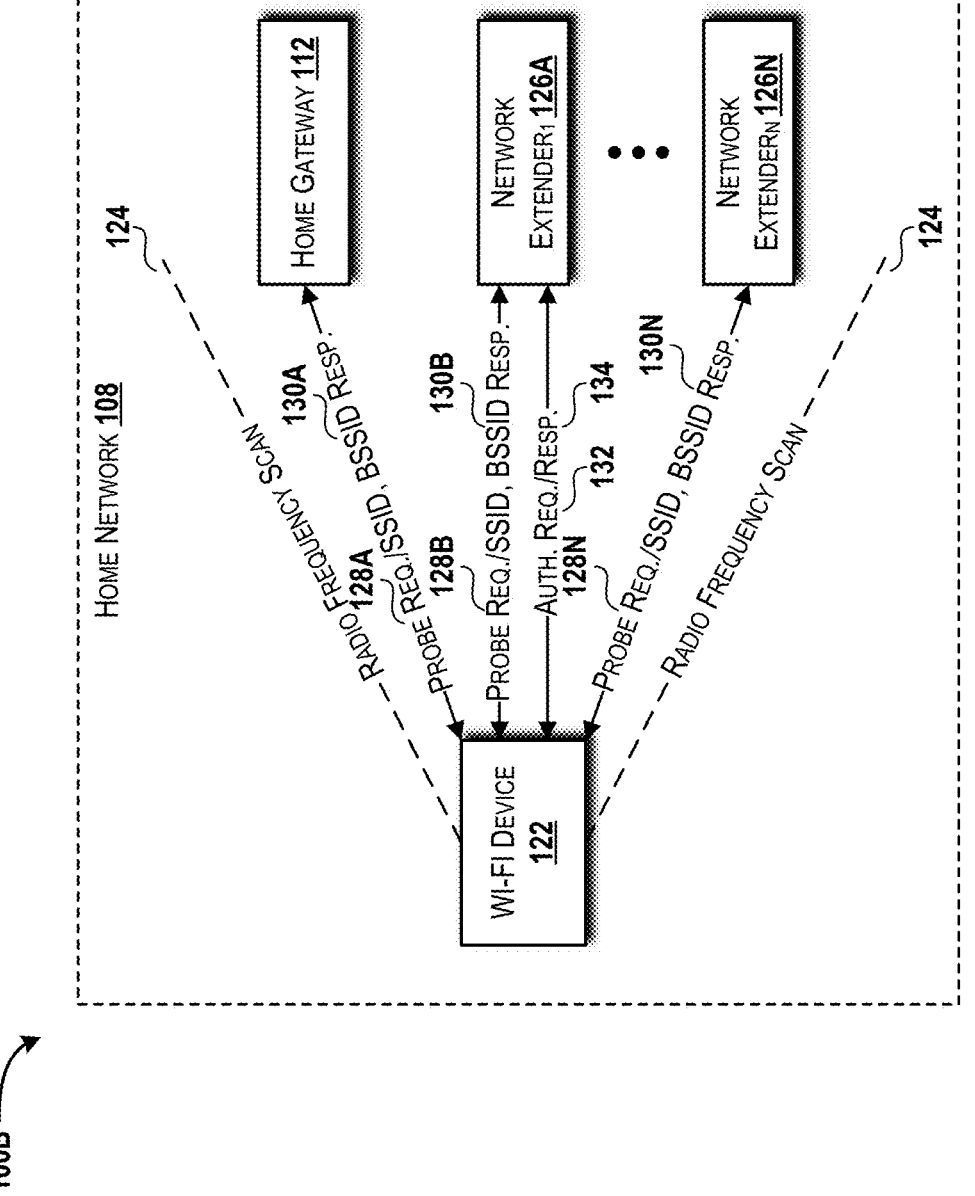

It should be noted that devices may communicate with the home gateway 112 without connecting to the home gateway 112. This scenario is depicted in FIG. 1B. Turning briefly to FIG. 1B, the operating environment 100B includes the home network 108 in which a WI-FI device 122, such as one of the home network device(s) 106 or the attacker device 118, can periodically scan radio frequencies (shown as "radio frequency scan 124") for nearby WI-FI access points, such as the home gateway 112 and/or one or more network extenders 126A-126N. When the WI-FI device 122 finds an access point, the WI-FI device 122 can send a probe request, such as one of the probe requests 128A-128N to the access point. In the illustrated example, the WI-FI device 122 finds the home gateway 112, a first network extender 126A, and an $n^{th}$ network extender 126N, and can send probe requests 128A, 128B, 128N to each of the access points, respectively. In response, each of the home gateway 112, the first network extender 126A, and the $n^{th}$ network extender 126N can provide a response 130A, 130B, 130N that includes a service set identifier ("SSID") and a basic service set identifier ("BSSID") of the networks provided by the access points (collectively the home network 108). The access points are now aware of the WI-FI device 122 and can obtain signal quality measurements such as RSSI from the WI-FI device 122. If the WI-FI device 122 attempts to connect to an access point, the WI-FI device 122 can send an authentication request 132 to that access point (the first network extender 126A in the illustrated example). The access point can respond with an authentication response 134 indicating whether or not the WI-FI device 122 is authenticated to access the access point.

Returning to FIG. 1A, the attacker location identifier module 114 obtains RSSI measurements that the home gateway 112 and any additional network extenders 126 collected from the WI-FI device 122 based upon the probe requests 128A-128N and the authentications request 132 described in FIG. 1B. These measurements can be used by the attacker location identifier module 114 to estimate the location of the WI-FI device 122. Each measurement represents the signal quality and signal strength between the WI-FI device 122 and an access point. A WI-FI device 122 that is nearby an access point, such as one of the home network devices 106 being nearby the home gateway 112, typically would have a higher signal quality and signal strength than another device (e.g., the attacker device 118) that is farther from the access point. The measurements may vary between devices for a given location, but these measurements provide a rough estimate of a distance that the WI-FI device 122 is from the access point.

Figure 1C:
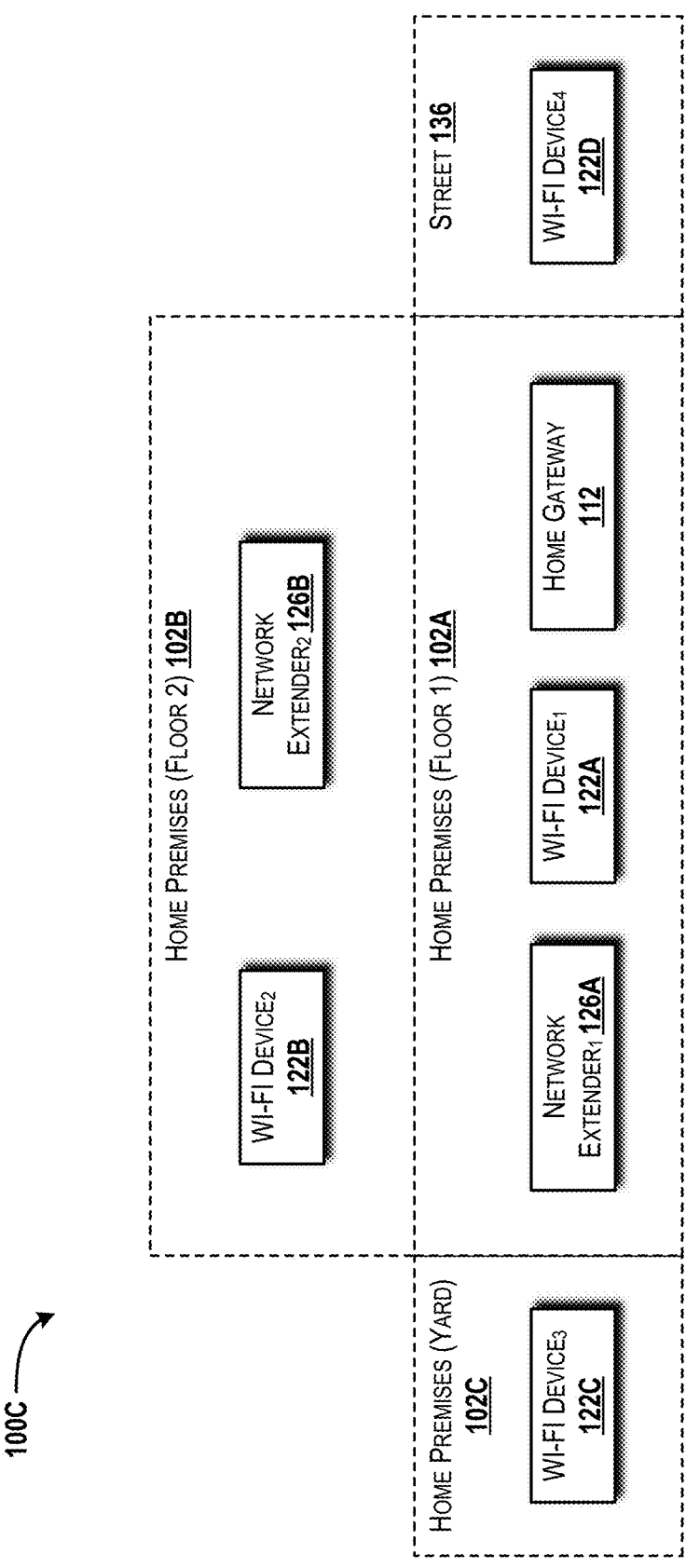

Turning briefly to FIG. 1C, the operating environment 100C illustrates the home premises 102 divided into a first floor 102A, a second floor 102B, and a yard 102C. A street 136 adjacent to the home premises 102 is also shown. In this example, the home network 108 is provided by the home gateway 112 operating on the first floor 102A, the first network extender 126A also operating on the first floor 102A, and the second network extender 126B operating on the second floor 102B. A first WI-FI device 122A on the first floor 102A may show good RSSI values to the home gateway 112 and fair RSSI values to the network extenders 126A, 126B. A second WI-FI device 122B on the second floor 102B may show good RSSI values to the second network extender 126B, fair RSSI values to the first network extender 126A, and poor RSSI values to the home gateway 112. A third WI-FI device 122C in the yard 102C may have a signal only from the first network extender 126A. Therefore, the third WI-FI device 122C will have RSSI measurements only from the first network extender 126A. A fourth WI-FI device 122D in the street 136 may have a fair or poor signal to the home gateway 112, a poor or no signal to the second network extender 126B, and no signal to the first network extender 126A. This example demonstrates a case in which the home gateway 112 can distinguish between classes of device locations (e.g., in house, yard, or street), even if the home gateway 112 cannot necessarily determine the exact location. The attacker location identifier module 114 can apply algorithms to determine whether or not a given WI-FI device 122 is in the street 136 location.

Figure 1D:
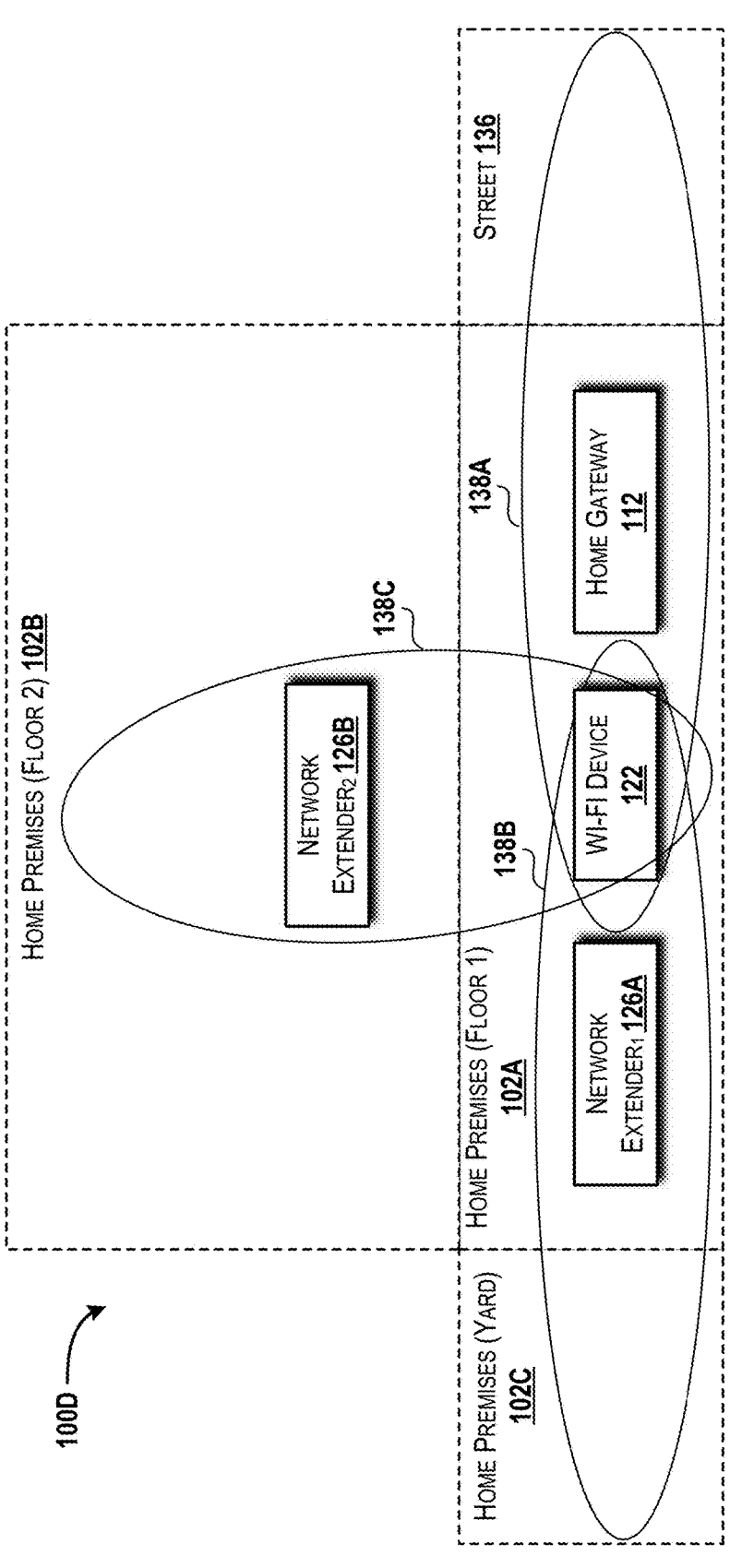

The attacker location identifier module 114 can apply a first algorithm that relies on knowing the layout of the home gateway 112 and any network extenders 126 that provide the home network 108. Based upon the layout, the first algorithm can calculate an approximate radius and circumference around each access point. The concatenation of all circumferences determines an approximate device location. Then, the radio can be adjusted to a device type based upon historical measurements. FIG. 1D depicts an example of the first algorithm.

Turning briefly to FIG. 1D, the operating environment 100D includes the home premises 102 divided into the first floor 102A, the second floor 102B, and the yard 102C. A street 136 adjacent to the home premises 102 is also shown. In this example, the home network 108 is provided by the home gateway 112 operating on the first floor 102A, the first network extender 126A operating on the first floor 102A, and the second network extender 126B operating on the second floor 102B. A first circumference 138A is shown around the home gateway 112, a second circumference 138B is shown around the first network extender 126A, and a third circumference 138C is shown around the second network extender 126B. The concatenation of these circumferences 138A-138C is shown surrounding the WI-FI device 122, thus providing an approximate location in the middle of the first floor 102 between the first network extender 126A and the home gateway 112. Over time, the first algorithm can learn and improve based on WI-FI devices 122 with fixed locations (e.g., IoT devices) and/or input provided by home occupants (e.g., the user 104) of an actual location of the WI-FI device 122 (i.e., reinforcement learning).

The attacker location identifier module 114 can apply a second algorithm to learn how the measurements of WI-FI devices 122 from the street 136 (or elsewhere outside the home premises 102) may differ from known WI-FI devices 122 that go in and out of the home premises 102. For example, a smartphone of one of the home occupants (e.g., the user 104) would disconnect from the home network 108 when the occupant is away. However, when the user 104 gets close to the home premises 102 (e.g., getting to the drive-way), the smartphone detects the home WI-FI network (e.g., the home network 108) and sends the probe request 128 with a weak signal. Then, when the smartphone breaches a perimeter of the home premises 102, the signal is expected to improve. Identifying these patterns of incoming and outgoing devices with their signal strength patterns can help identify unfamiliar devices that get closer to the home premises 102, including those of war driving attackers (e.g., the attacker 116).

Returning to FIG. 1A, the network(s) 110 can include a war driving activity correlation system 140 that may be owned and/or operated by an ISP associated with the home gateway 112 and/or another entity. The war driving activity correlation system 140 can obtain reports 142 from a malicious devices analyzer module 144 executed by the home gateway 112 (and similar modules executed by other nearby home gateways best shown in FIG. 1E) and attempt to establish a route of the war driver (i.e., the attacker 116) as it is likely that the war driving tasks include a region (e.g., a particular street or neighborhood) rather than a single home (e.g., only the home premises 102). More particularly, the malicious devices analyzer module 144 can analyze one or more patterns of observed WI-FI devices 122 operating in the street 136 (shown in FIG. 1C-1E) or elsewhere. The malicious devices analyzer module 144 can utilize machine learning techniques to classify benign and malicious pat-terns. For example, a mail truck typically drives a similar route every day. The mailman may have a WI-FI device 122 that may appear to scan the home network 108 when the WI-FI device 122 approaches the home premises 102 and similarly scan other home networks along the route. This behavior should be marked as benign in most cases. As such, the malicious devices analyzer module 144 can use metrics about the WI-FI device(s) 122 that the attacker location identifier module 114 identified (e.g., one or more of the home network device(s) 102 and/or the attacker device 118) and can analyze the behavior thereof. The metrics can include a device MAC address, a device type, a device mobility type (e.g., stationary or mobile), a time of day, a duration of connection, a number of failed authentication attempts, and a number of successful authentication attempts. The malicious devices analyzer module 144 may collect additional and/or alternative metrics based upon the needs of a given implementation. The reports 142 can include any behavior patterns and/or metrics collected by the malicious devices analyzer module 144 in addition to the attacker location 120 identified by the attacker location identifier module 114.

The malicious devices analyzer module 144 can first check whether a given WI-FI device 122 is known to the home gateway 112. A known device may be part of the household or some other device that previously contacted the home network 108 (e.g., the home network device(s) 106). If the given WI-FI device 122 is known and marked as trusted, the malicious devices analyzer module 144 con-cludes the analysis. A typical case of an untrusted device would be a known WI-FI device 122, such as a smart bulb, that was connected to the home network 108 and maintained the same location within the home premises 102 until this device is suddenly identified in the street 136 (see FIGS. 1C-1E). In this case, the WI-FI device 122 is very likely to be a spoofed device (i.e., the attacker device 118). Following the example of a smart bulb, if the attacker 116 wants to trick the home network 108 into determining that the attacker device 118 is a trusted device, the attacker 116 can use a known MAC address of the WI-FI device 122 as the MAC address of the attacker device 118.

The malicious devices analyzer module 144 can identify the above scenario by identifying a WI-FI device 122 that should be in the home (i.e., within the home premises 102), but instead appears in the street 136. Otherwise, the mali-cious devices analyzer module 144 can check the device type. Some WI-FI devices 122, such as dedicated WI-FI scanners, are more popular for war driving attacks. Devices that have a device type of WI-FI scanner therefore could be tagged as suspicious. The time of the day and the duration can be used for further analysis of benign recurrent devices. An example of devices of this device type could be devices associated with people who go through a regular route in the street as part of their job. For example, a mail carrier would appear at about the same time every day. Utility meter readers would appear near the home network 108 approxi-mately once a month. These devices would be tagged as known and eventually tagged as trusted. Finally, the fact that an unknown device fails to authenticate from the street 136 makes it suspicious. It should be noted that known and trusted devices may fail to authenticate from the street 136 if someone changed the network password since the known and trusted devices last visited the home network 108.

The network(s) 110 also can include a policy engine 146 that maintains the logic of what operations are allowed from the street 136, such as probe requests 128 or authentication requests 132. The policy engine 146 also determines how long a particular policy should take place per device. For example, a trusted device that has been inactive for more than three months should be removed from the trusted devices list. Application of such a policy would help in some cases of spoofed devices. The policy engine 146 can include a default policy to deny any authentication attempt from the street 136 other than from devices that appear on a list of trusted devices. The list of trusted devices can include devices that already authenticated successfully to the home network 108 and are of a device type that travels in and out of the home premises 102. Another default policy can be to deny probe requests 128 from suspicious devices on the street 136 (e.g., WI-FI scanners) that are listed as malicious by one or more neighboring home gateways 112. An example of this will now be described with reference to FIG. 1E.

Figure 1E:
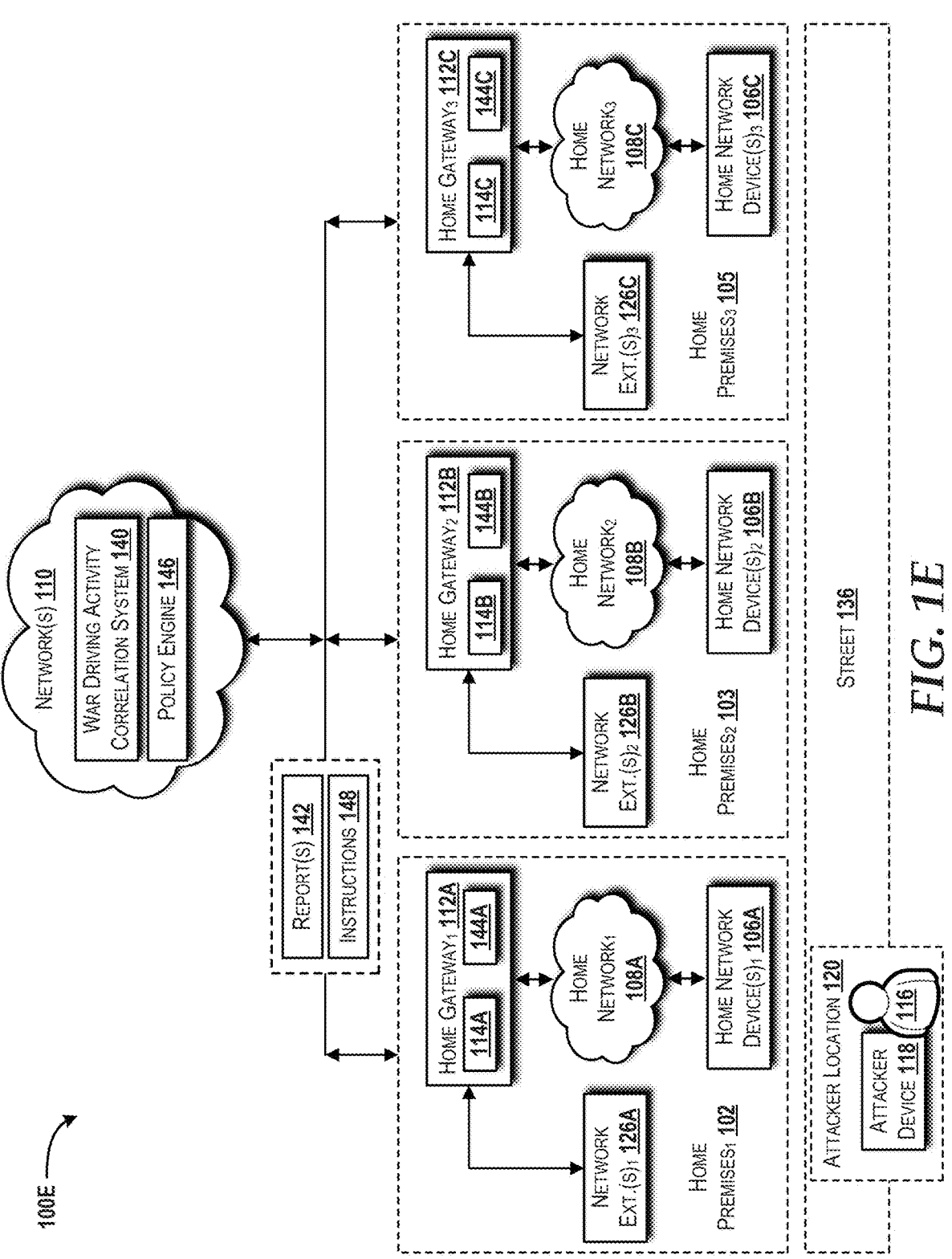

Turning now to FIG. 1E, the home premises 102 is illustrated next to a second home premises 103, and a third home premises 105. The second home premises 103 and the third home premises 105 are configured the same as the first home premises 102. For example, the second home premises 103 includes one or more second home network devices 106B operating in communication with a second home network 108B that is provided, at least in part, by a second home gateway 112B and may be extended by one or more second network extenders 126B. Similarly, the third home premises 105 includes one or more third home network devices 106C operating in communication with a third home network 108C that is provided, at least in part, by a third home gateway 112C and may be extended by one or more third network extenders 126C. The attacker 116 and the attacker device 118 are shown in the attacker location 120 in the street 136 that runs adjacent to the home premises 102, 103, and 105.

Each of the home gateways 112A-112C can provide the reports 142 to the war driving activity correlation system 140 that, in turn, can attempt to establish, based upon the reports 142, a route of the war driver (i.e., the attacker 116) along the street 136. More particularly, the malicious devices analyzer modules 144A-144C can analyze a pattern of the attacker device 118. The malicious devices analyzer modules 144A-144C, based at least in part on metrics determined by the attacker location identifier modules 114A-114C, can utilize machine learning techniques to classify the pattern of the attacker device 118 as malicious and generate the reports 142 directed to the war driving activity correlation system 140. The war driving activity correlation system 140 can utilize the policy engine 146 to determine one or more actions to be taken to resolve the war driving campaign of the attacker 116 and can provide instructions 148 to the home gateways 112A-112C in this regard. For example, the instructions 148 can identify the attacker device 118 by a MAC address that can be added to a MAC address blacklist maintained by the home gateways 112A-112C.

Figure 2:
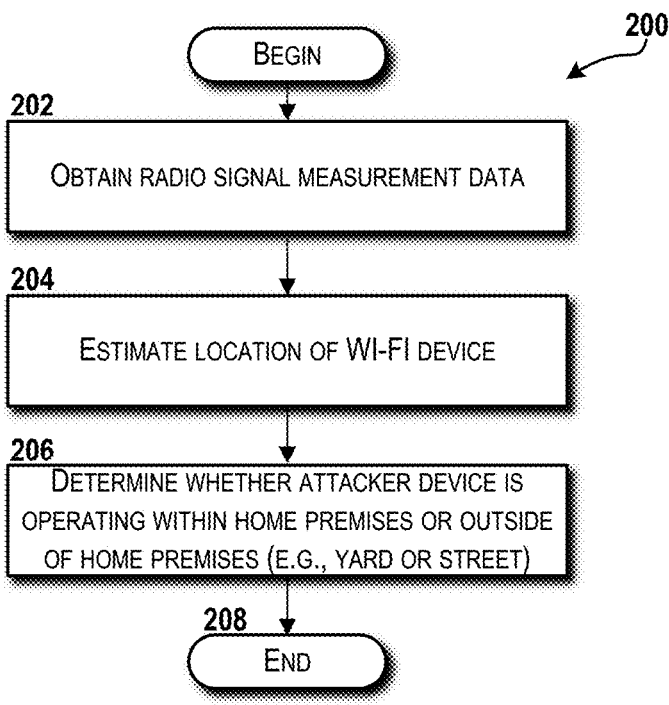
FIG. 2 is a flow diagram illustrating aspects of a method for estimating a device location, according to an illustrative embodiment of the concepts and technologies disclosed herein.

Turning now to FIG. 2, a flow diagram illustrating aspects of a method 200 for estimating a device location will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the attacker location identifier module 114 obtains radio signal measurement data (e.g., RSSI measurements). The home gateway 112 and any additional network extenders 126 can collect the radio signal measurement data from one or more WI-FI devices 122, such as the home network device(s) 106 and/or the attacker device 118, based upon the probe requests 128A-128N and the authentications requests 132 described in FIG. 1B.

From operation 202, the method 200 proceeds to operation 204. At operation 204, the attacker location identifier module 114 estimates a location of the WI-FI device 122 based upon the radio signal measurement data. Each measurement represents the signal quality and signal strength between the WI-FI device 122 and an access point. A WI-FI device 122 that is nearby an access point, such as one of the home network devices 106 being nearby the home gateway 112, typically would have a higher signal quality and signal strength than another device (e.g., the attacker device 118) that is farther from the access point. The measurements may vary between devices for a given location, but these measurements provide a rough estimate of a distance that the WI-FI device 122 is from the access point.

From operation 204, the method 200 proceeds to operation 206. At operation 206, the attacker location identifier module 114 determines whether the WI-FI device 122 is operating within the home premises 102 or outside of the home premises 102 (e.g., in the yard 102C or the street 136). The attacker location identifier module 114 can determine whether the WI-FI device 122 is operating within the home premises 102 or outside of the home premises 102 by implementing an algorithm that relies on the layout of the home gateway 112 and any network extenders 126 that provide the home network 108 within the home premises 102. An example method 300 for determining whether the WI-FI device 122 is operating within the home premises 102 or outside of the home premises 102 based upon a layout of the home gateway 112 and any network extenders 126 within the home premises 102 will be described below with reference to FIG. 3. Alternatively, the attacker location identifier module 114 can determine whether the WI-FI device 122 is operating within the home premises 102 or outside of the home premises 102 by implementing an algorithm to learn how the measurements of WI-FI devices 122 from the street 136 (or elsewhere outside the home premises 102 as the case may be) differ from known WI-FI devices 122 that go in and out of the home premises 102. An example method 400 for implementing this algorithm will be described herein below with reference to FIG. 4.

From operation 206, the method 200 proceeds to operation 208. The method 200 can end at operation 208.

Figure 3:
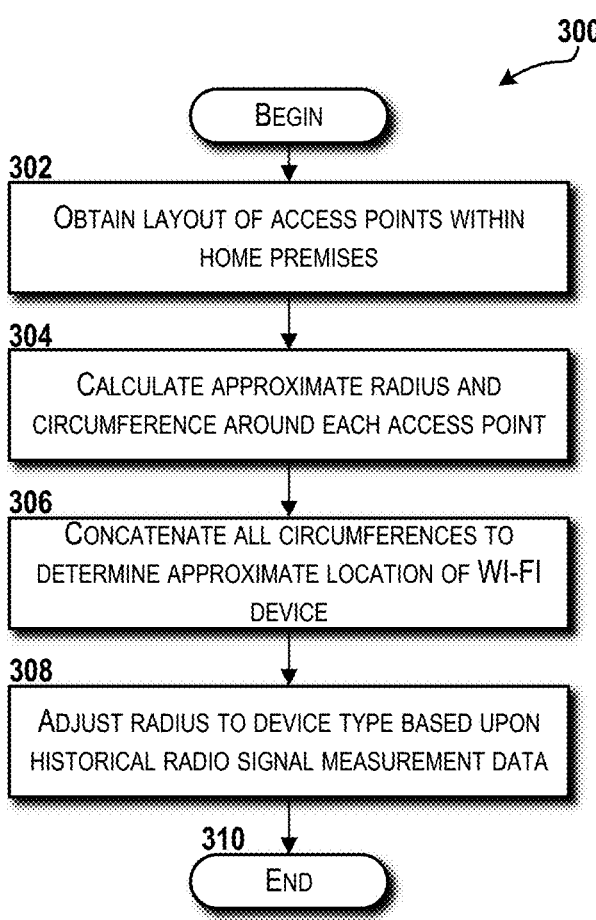
FIG. 3 is a flow diagram illustrating aspects of a method for determining whether a WI-FI device is operating within a home premises or outside of the home premises based upon a layout of a home gateway and any network extenders within the home premises, according to an illustrative embodiment of the concepts and technologies disclosed herein.

Turning now to FIG. 3, a flow diagram illustrating aspects of the method 300 for determining whether the WI-FI device 122 is operating within the home premises 102 or outside of the home premises 102 based upon a layout of the home gateway 112 and any network extenders 126 within the home premises 102 will be described, according to an illustrative embodiment of the concepts and technologies disclosed herein. The method 300 begins and proceeds to operation 302. At operation 302, the attacker location identifier module 114 obtains a layout of any access points (e.g., the home gateway 112 and any network extenders 126) within the home premises 102. In some embodiments, the user 104 can provide the layout.

From operation 302, the method 300 proceeds to operation 304. At operation 304, the attacker location identifier module 114 calculates an approximate radius and circumference of an area served by each access point identified in the layout. FIG. 1D illustrates a relevant example in which a first circumference 138A is shown around the home gateway 112, a second circumference 138B is shown around the first network extender 126A, and a third circumference 138C is shown around the second network extender 126B. From operation 304, the method 300 proceeds to operation 306. At operation 306, the attacker location identifier module 114 concatenates the circumferences to determine an approximate location of the WI-FI device 122. Referring again to FIG. 1D, the concatenation of these circumferences 138A-138C is shown surrounding the WI-FI device 122, thus providing an approximate location in the middle of the first floor 102A between the first network extender 126A and the home gateway 112. From operation 306, the method 300 proceeds to operation 308. At operation 308, the attacker location identifier module 114 adjusts the radius to the device type based upon historical radio signal measurement data. In some embodiments, the method 300 can be used over time to learn and improve based on WI-FI devices 122 with fixed locations (e.g., IoT devices) and/or input provided by home occupants (e.g., the user 104) of an actual location of the WI-FI device 122 (i.e., reinforcement learning).

From operation 308, the method 300 proceeds to operation 310. The method 300 can end at operation 310.

Figure 4:
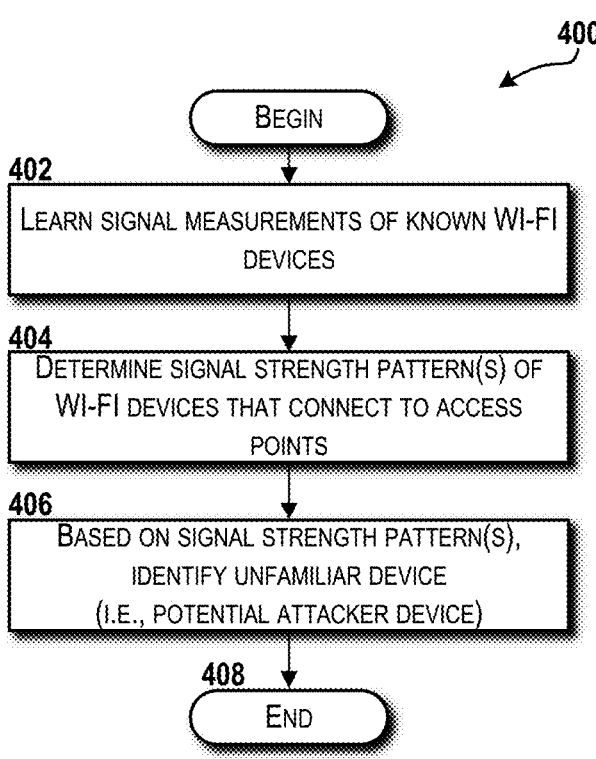
FIG. 4 is a flow diagram illustrating aspects of a method for identifying an unfamiliar device, according to an illustrative embodiment of the concepts and technologies disclosed herein.

Turning now to FIG. 4, a flow diagram illustrating aspects of the method 400 for identifying an unfamiliar device will be described, according to an illustrative embodiment of the concepts and technologies disclosed herein. The method 400 begins and proceeds to operation 402. At operation 402, the attacker location identifier module 114 learns radio signal measurements of known WI-FI devices 122, such as one or more of the home network devices 106. From operation 402, the method 400 proceeds to operation 404. At operation 404, the attacker location identifier module 114 determines one or more signal strength patterns of the WI-FI devices 122 that connect to one or more access points (i.e., the home gateway 112 and/or one or more network extenders 126). From operation 404, the method 400 proceeds to operation 406. At operation 406, based upon the signal strength patterns determined at operation 404, the attacker location identifier module 114 identifies any unfamiliar device(s) as potentially the attacker device 118. From operation 406, the method 400 proceeds to operation 408. The method 400 can end at operation 408.

Figure 5:
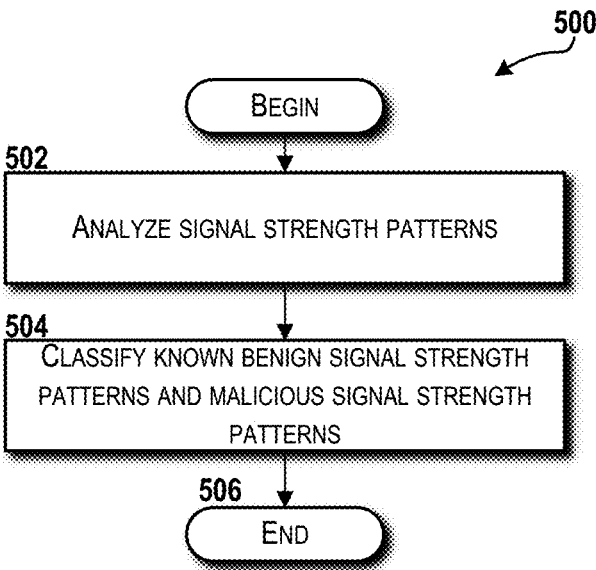
FIG. 5 is a flow diagram illustrating aspects of a method for classifying behavior patterns, according to an illustrative embodiment of the concepts and technologies disclosed herein.

Turning now to FIG. 5, a flow diagram illustrating aspects of a method 500 for classifying behavior patterns will be described, according to an illustrative embodiment of the concepts and technologies disclosed herein. The method 500 begins and proceeds to operation 502. At operation 502, the malicious devices analyzer module 144 analyzes one or more signal strength patterns of observed WI-FI devices 122 operating outside of the home premises 102, such as in the street 136 or elsewhere. More particularly, the malicious devices analyzer module 144 can first check whether a given WI-FI device 122 is known to the home gateway 112. A known device may be part of the household or some other device that previously contacted the home network 108 (e.g., the home network device(s) 106). If the given WI-FI device 122 is known and marked as trusted, the malicious devices analyzer module 144 concludes the analysis. A typical case of an untrusted device would be a known WI-FI device 122, such as a smart bulb, that was connected to the home network 108 and maintained the same location within the home premises 102 until this device is suddenly identified in the street 136 (see FIGS. 1C-1E). In this case, the WI-FI device 122 is very likely to be a spoofed device (i.e., the attacker device 118). Following the example of a smart bulb, if the attacker 116 wants to trick the home network 108 into determining that the attacker device 118 is a trusted device, the attacker 116 can use a known MAC address of the WI-FI device 122 as the MAC address of the attacker device 118.

From operation 502, the method 500 proceeds to operation 504. At operation 504, the malicious devices analyzer module 144 classifies the patterns as either benign or malicious. For example, a mail truck typically drives a similar route every day. The mailman may have a WI-FI device 122 that may appear to scan the home network 108 when the WI-FI device 122 approaches the home premises 102 and similarly scan other home networks along the route. This behavior should be marked as benign in most cases. As such, the malicious devices analyzer module 144 can use metrics about the WI-FI device(s) 122 that the attacker location identifier module 114 identified (e.g., one or more of the home network device(s) 102 and/or the attacker device 118) and can analyze the behavior thereof. The metrics can include a device MAC address, a device type, a device mobility type (e.g., stationary or mobile), a time of day, a duration of connection, a number of failed authentication attempts, and a number of successful authentication attempts. The malicious devices analyzer module 144 may collect additional and/or alternative metrics based upon the needs of a given implementation.

The malicious devices analyzer module 144 can identify the above scenario by identifying a WI-FI device 122 that should be home (i.e., within the home premises 102), but instead appears in the street 136. Otherwise, the malicious devices analyzer module 144 can check the device type. Some WI-FI devices 122, such as dedicated WI-FI scanners, are more popular for war driving attacks. Devices that have a device type of WI-FI scanner therefore could be tagged as suspicious. The time of the day and the duration can be used for further analysis of benign recurrent devices. An example of devices of this device type could be devices associated with people who go through a regular route in the street as part of their job. For example, a mail carrier would appear at about the same time every day. Utility meter readers would appear near the home network 108 approximately once a month. These devices would be tagged as known and eventually tagged as trusted. Finally, the fact that an unknown device fails to authenticate from the street 136 makes it suspicious. It should be noted that known and trusted devices may fail to authenticate from the street 136 if someone changed the network password since the known and trusted devices last visited the home network 108. From operation 504, the method 500 proceeds to operation 506. The method 500 can end at operation 506.

Figure 6:
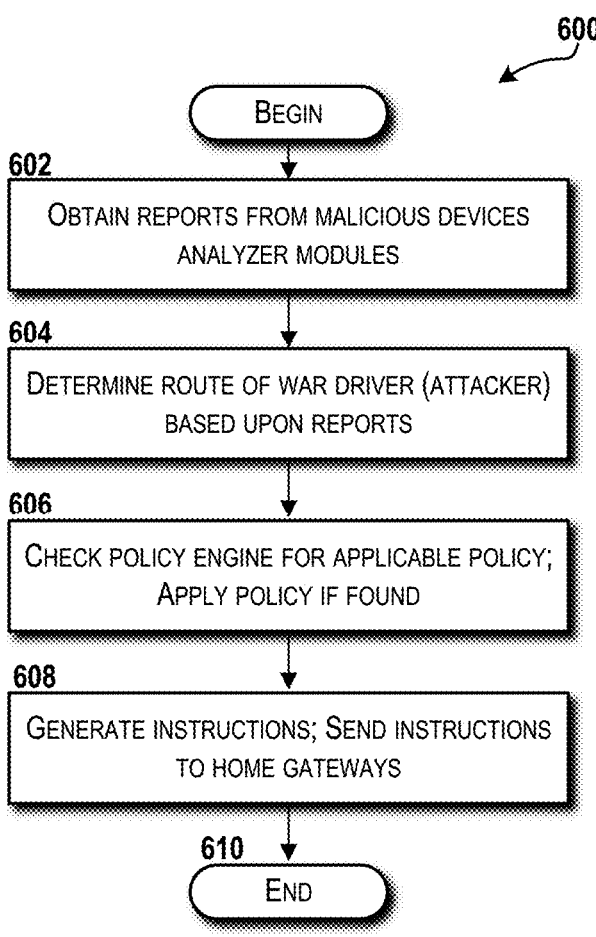
FIG. 6 is a flow diagram illustrating aspects of a method for correlating war driving activity, according to an illustrative embodiment of the concepts and technologies disclosed herein.

Turning now to FIG. 6, a flow diagram illustrating aspects of a method 600 for correlating war driving activity will be described, according to an illustrative embodiment of the concepts and technologies disclosed herein. The method 600 begins and proceeds to operation 602. At operation 602, the war driving activity correlation system 140 obtains the reports 142 from the malicious devices analyzer modules 144 executed by the home gateways 112 operating in multiple home premises 102 (see FIG. 1E). From operation 602, the method 600 proceeds to operation 604. At operation 604, the war driving activity correlation system 140 determines a route of the war driver (i.e., the attacker) based upon the reports 142. From operation 604, the method 600 proceeds to operation 606. At operation 606, the war driving activity correlation system 140 can check the policy engine 146 for any applicable policies. If the policy engine has an applicable policy, the war driving activity correlation system 140 can apply the policy. From operation 606, the method 600 proceeds to operation 608. At operation 608, the war driving activity correlation system 140 generates instructions 148 and sends the instructions to the home gateways 112. From operation 608, the method 600 can proceed to operation 610. The method 600 can end at operation 610.

Figure 7:
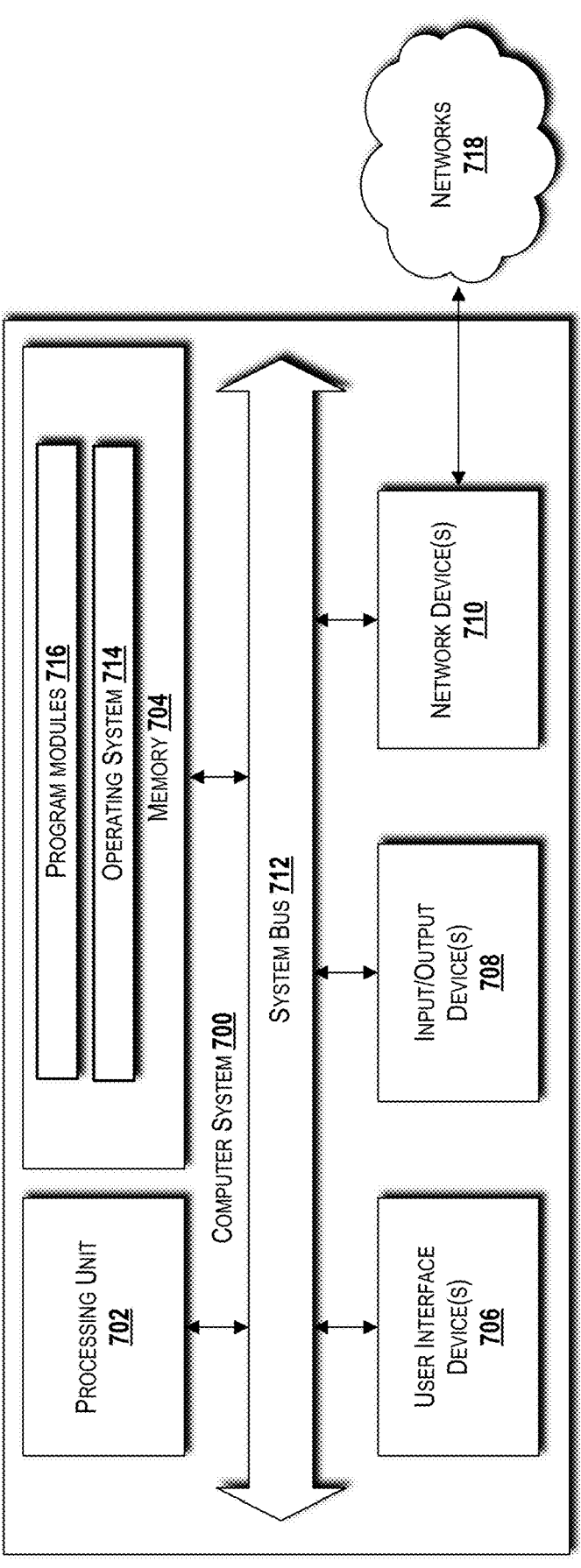
FIG. 7 is a block diagram illustrating an example computer system capable of implementing aspects of the concepts and technologies disclosed herein.

Turning now to FIG. 7, a block diagram illustrating a computer system 700 configured to provide the functionality described herein in accordance with various embodiments will be described. In some embodiments, aspects of the home network device(s) 106, the home gateway 112, the attacker device 118, the network extender(s) 126, the war driving activity correlation system 140, the policy engine 146, one or more systems/devices operating on or in communication with the home network 108, one or more systems operating on or in communication with the network(s) 110, and/or other systems disclosed herein can be configured the same as or similar to the computer system 700.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 702 can be a single processing unit or a multiple processing unit that includes more than one processing component. Processing units are generally known, and therefore are not described in further detail herein.

The memory 704 communicates with the processing unit 702 via the system bus 712. The memory 704 can include a single memory component or multiple memory components. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, a member of the ANDROID OS family of operating systems from GOOGLE LLC, the FREEBSD family of operating systems, the SOLARIS family of operating systems from ORACLE CORPORATION, other operating systems, and the like.

The program modules 716 may include various software and/or program modules described herein. In embodiments that the home gateway 112 utilizes an architecture similar to or the same as the computer system 700, the program modules 716 can include, for example, the attacker location identifier module 114 and the malicious devices analyzer module 144. In some embodiments, multiple implementations of the computer system 700 can be used, wherein each implementation is configured to execute one or more of the program modules 716. The program modules 716 and/or other programs can be embodied in computer-readable media containing instructions that, when executed by the processing unit 702, perform the method 300 described herein. According to embodiments, the program modules 716 may be embodied in hardware, software, firmware, or any combination thereof. The memory 704 also can be configured to store data described herein.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium," "computer-readable storage medium," and variations thereof does not include waves or signals per se and/or communication media, and therefore should be construed as being directed to "non-transitory" media only.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, a touch-sensitive surface, or an electronic stylus. Further, the I/O devices 708 may include one or more output devices.

The network devices 710 enable the computer system 700 to communicate with one or more networks 718, such as the home network 108 and/or the network(s) 110 described herein. Examples of the network devices 710 include, but are not limited to, a modem, a radio frequency ("RF") or infrared ("IR") or ultraviolet ("UV") transceiver, a telephonic interface, a bridge, a router, or a network card. The network 718 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 718 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
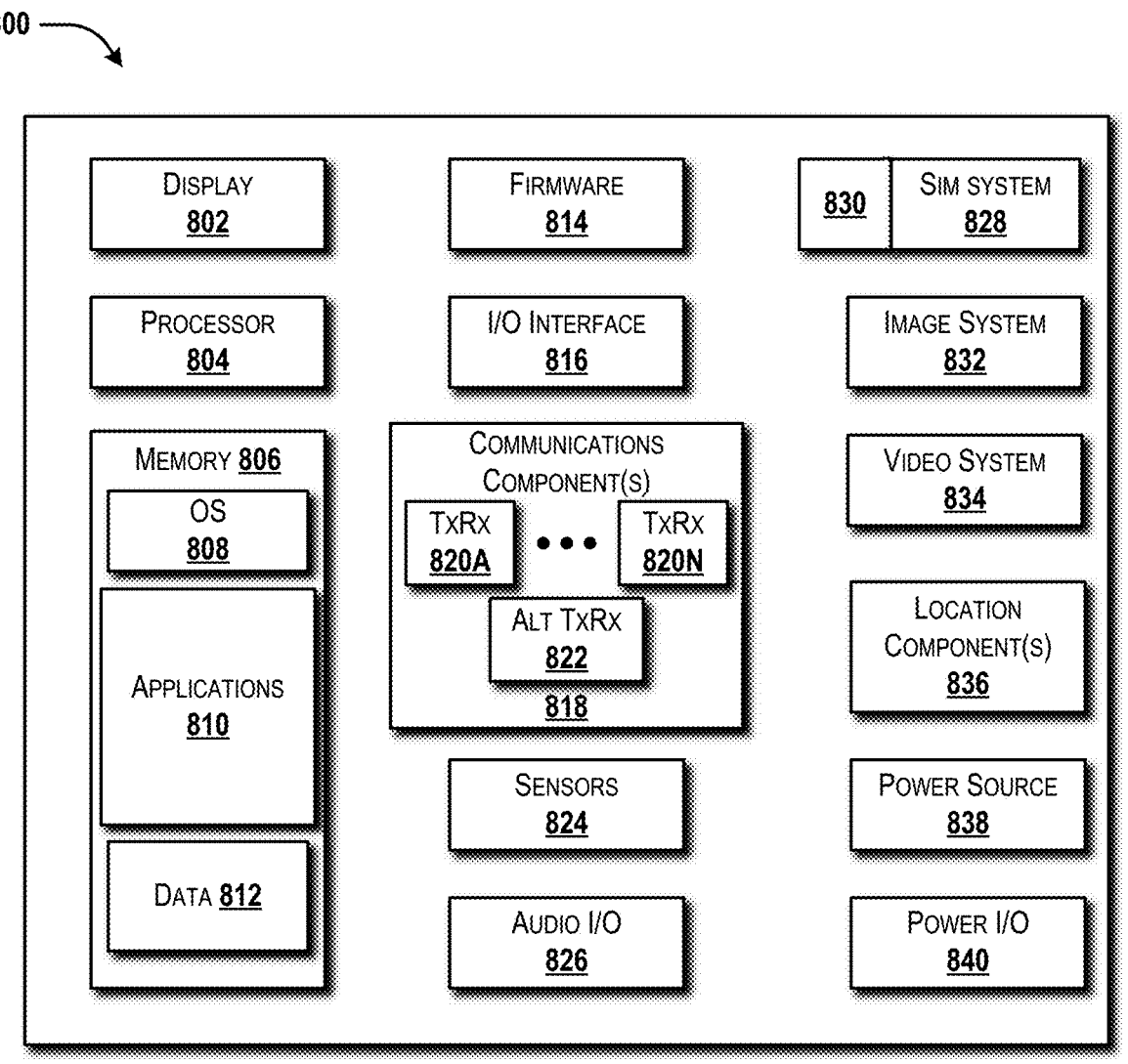
FIG. 8 is a block diagram illustrating an example mobile device capable of implementing aspects of the concepts and technologies disclosed herein.

Turning now to FIG. 8, an illustrative mobile device 800 and components thereof will be described. In some embodiments, the home network device(s) 106 can be configured the same as or similar to the mobile device 800. In some embodiments, the attacker device 118 can be configured the same as or similar to the mobile device 800. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 800 can also include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in the memory 806, or the like. The applications 810 can include, for example, a client application or companion application associated with the home gateway 112. In some embodiments, the applications 810 can also include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering/deleting data, entering and setting user IDs and passwords for device access, configuring settings, manipulating content and/or settings, multimode interaction, interacting with other applications 810, and otherwise facilitating user interaction with the operating system 808, the applications 810, and/or other types or instances of data 812 that can be stored at the mobile device 800.

The applications 810, the data 812, and/or portions thereof can be stored in the memory 806 and/or in a firmware 814, and can be executed by the processor 804. The firmware 814 can also store code for execution during device power up and power down operations. It can be appreciated that the firmware 814 can be stored in a volatile or non-volatile data storage device including, but not limited to, the memory 806 and/or a portion thereof.

The mobile device 800 can also include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 can also include a communications component 818. The communications component 818 can be configured to interface with the processor 804 to facilitate wired and/or wireless communications with one or more networks, such as ISP network(s), the Internet, the home network 108, the network(s) 110, or some combination thereof. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments, one or more of the transceivers of the communications component 818 may be configured to communicate using GSM, CDMA CDMAONE, CDMA2000, LTE, and various other 2G, 2.5G, 3G, 4G, 4.5G, 5G, 6G, 7G, and greater generation technology standards. Moreover, the communications component 818 may facilitate communications over various channel access methods (which may or may not be used by the aforementioned standards) including, but not limited to, TDMA, FDMA, CDMA, W-CDMA, OFDMA, SDMA, and the like.

In addition, the communications component 818 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 5G technologies and standards, and various other current and future wireless data access technologies and standards. In the illustrated embodiment, the communications component 818 can include a first transceiver ("TxRx") 820A that can operate in a first communications mode (e.g., GSM). The communications component 818 can also include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 can also include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 can also facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 can also include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 can also include a subscriber identity module ("SIM") system 828. The SIM system 828 can include a universal SIM ("USIM"), a universal integrated circuit card ("UICC"), embedded SIM ("eSIM"), and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Additionally, or alternatively, an embedded SIM may be used. Because other devices and/or modules for identifying users and/or the mobile device 800 are contemplated, it should be understood that these embodiments are illustrative, and should not be construed as being limiting in any way.

The mobile device 800 can also include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another device. The video and/or photo content can also be shared with other devices via various types of data transfers via wired and/or wireless communication devices as described herein.

The mobile device 800 can also include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 can also be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 can also include a power source 838. The power source 838 can include one or more batteries, power supplies, power cells, and/or other power subsystems including alternating current ("AC") and/or direct current ("DC") power devices. The power source 838 can also interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system 700 described above with reference to FIG. 7. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 800 in order to store and execute the software also components presented herein. It is contemplated that the mobile device 800 may not include all of the components shown in FIG. 8, may include other components that are not explicitly shown in FIG. 8, or may utilize an architecture completely different than that shown in FIG. 8.

Figure 9:
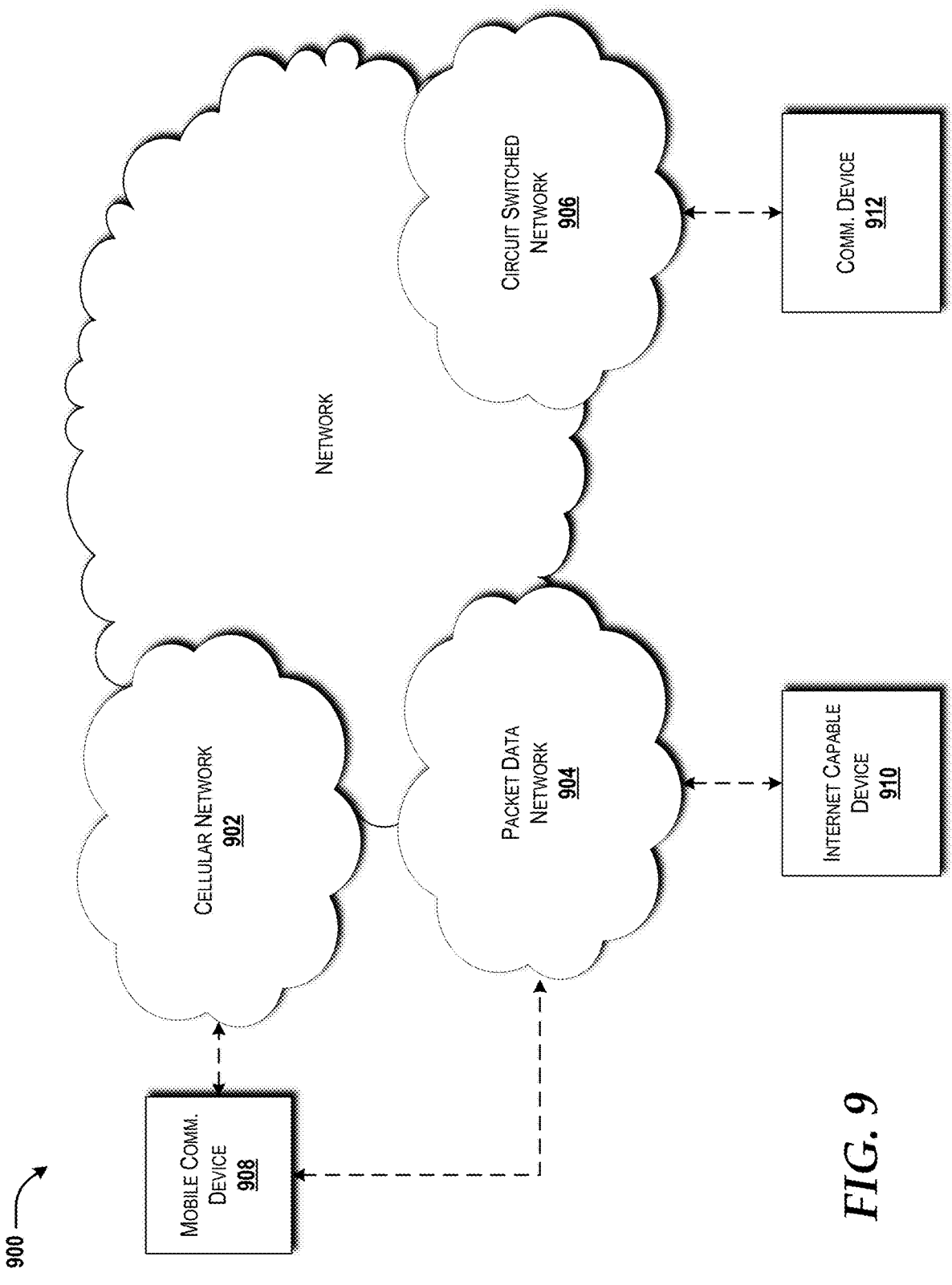
FIG. 9 is a block diagram illustrating an example network capable of implementing aspects of the concepts and technologies disclosed herein.

Turning now to FIG. 9, details of a network 900 are illustrated, according to an illustrative embodiment. The network 900 includes a cellular network 902, a packet data network 904, and a circuit switched network 906. In some embodiments, the network(s) 110, 718 are configured similar to or the same as the network 900.

The cellular network 902 includes various components such as, but not limited to, base stations, base transceiver stations ("BTSs"), node Bs ("NBs"), eNBs, gNBs, base station controllers ("BSCs"), radio network controllers ("RNCs"), mobile switching centers ("MSCs"), mobility management entities ("MMEs"), serving gateways ("SGWs"), packet data gateways ("PDGs"), evolved PDGs ("ePDGs"), AAA servers, home subscriber servers, short message service centers ("SMSCs"), multimedia messaging service centers ("MMSCs"), home location registers ("HLRs"), visitor location registers ("VLRs"), charging platforms, billing platforms, voicemail platforms, GPRS core network components, EPC core network components, future generation core network components, location service nodes, virtualizations thereof, combinations thereof, and/or the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, the home network device 106, the attacker device 118, the mobile device 800, a cellular telephone, a user equipment, a mobile terminal, a PDA, a laptop computer, a handheld computer, and combinations thereof, can be operatively connected to the cellular network 902 and/or the packet data network 904. The mobile communications device 908 can be configured similar to or the same as the mobile device 800 described above with reference to FIG. 8.

The cellular network 902 can be configured as a GSM network and can provide data communications via GPRS and/or EDGE. Additionally, or alternatively, the cellular network 902 can be configured as a 3G UMTS network and can provide data communications via the HSPA protocol family, for example, HSDPA, EUL, and HSPA+. The cellular network 902 also is compatible with mobile communications standards such as LTE, 5G-NR, or the like, as well as evolved and future mobile standards.

The packet data network 904 includes various systems, devices, servers, computers, databases, and other devices in communication with one another, as is generally known. The packet data network 904 also can include routers, switches, and other WI-FI network components. The packet data network 904 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable systems/devices 910 such as the home network device(s) 106, a laptop, a portable device, or another suitable device, can communicate with one or more cellular networks 902, and devices connected thereto, through the packet data network 904. It also should be appreciated that the mobile device 908, such as the mobile device 800, can communicate directly with the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910.

Figure 10:
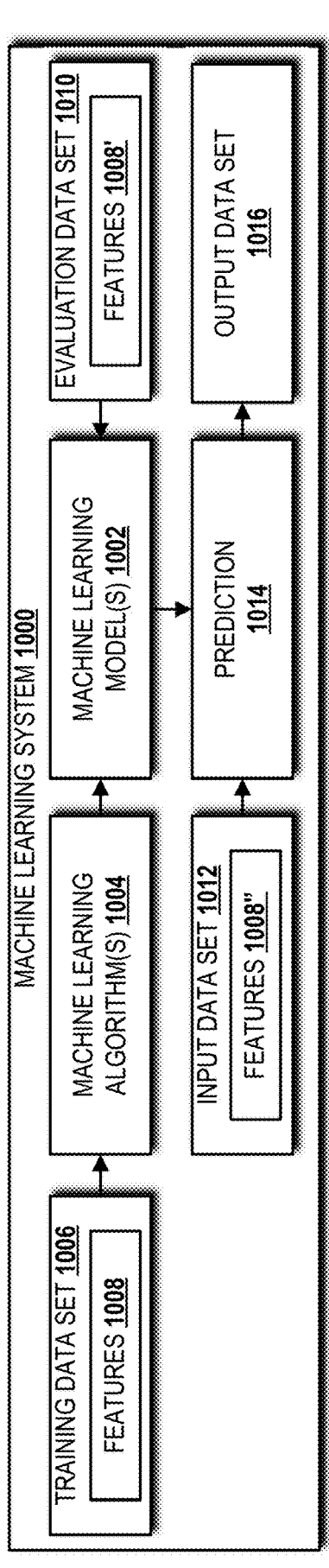
FIG. 10 is a block diagram illustrating an example machine learning system capable of implementing aspects of the concepts and technologies disclosed herein.

Turning now to FIG. 10, a machine learning system 1000 capable of implementing aspects of the embodiments disclosed herein will be described. In some embodiments, the home gateway 112 can include the machine learning system 1000. In other embodiments, the home gateway 112 can operate in communication with the machine learning system 1000. The malicious devices analyzer module 144 can utilize machine learning techniques provided by the machine learning system 1000 to classify benign and malicious patterns. In some embodiments, the war driving activity correlation system 140 can include the machine learning system 1000. In other embodiments, the war driving activity correlation system 140 can operate in communication with the machine learning system 1000.

The illustrated machine learning system 1000 includes one or more machine learning models 1002. The machine learning models 1002 can include, unsupervised, supervised, and/or semi-supervised learning models. The machine learning model(s) 1002 can be created by the machine learning system 1000 based upon one or more machine learning algorithms 1004. The machine learning algorithm(s) 1004 can be any existing, well-known algorithm, any proprietary algorithms, or any future machine learning algorithm. Some example machine learning algorithms 1004 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 1004 based upon the problem(s) to be solved by machine learning via the machine learning system 1000.

The machine learning system 1000 can control the creation of the machine learning models 1002 via one or more training parameters. In some embodiments, the training parameters are selected by machine learning modelers at the direction of an entity (e.g., a device manufacturer, ISP, other service provider, or the user 104). Alternatively, in some embodiments, the training parameters are automatically selected based upon data provided in one or more training data sets 1006. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1004 converges to the optimal weights. The machine learning algorithm 1004 can update the weights for every data example included in the training data set 1006. The size of an update is controlled by the learning rate. A learning rate that is too high might prevent the machine learning algorithm 1004 from converging to the optimal weights. A learning rate that is too low might result in the machine learning algorithm 1004 requiring multiple training passes to converge to the optimal weights.

The model size is regulated by the number of input features ("features") 1008 in the training data set 1006. A greater the number of features 1008 yields a greater number of possible patterns that can be determined from the training data set 1006. The model size should be selected to balance the resources (e.g., compute, memory, storage, etc.) needed for training and the predictive power of the resultant machine learning model 1002.

The number of training passes indicates the number of training passes that the machine learning algorithm 1004 makes over the training data set 1006 during the training process. The number of training passes can be adjusted based, for example, on the size of the training data set 1006, with larger training data sets being exposed to fewer training passes in consideration of time and/or resource utilization. The effectiveness of the resultant machine learning model 1002 can be increased by multiple training passes.

Data shuffling is a training parameter designed to prevent the machine learning algorithm 1004 from reaching false optimal weights due to the order in which data contained in the training data set 1006 is processed. For example, data provided in rows and columns might be analyzed first row, second row, third row, etc., and thus an optimal weight might be obtained well before a full range of data has been considered. By data shuffling, the data contained in the training data set 1006 can be analyzed more thoroughly and mitigate bias in the resultant machine learning model 1002.

Regularization is a training parameter that helps to prevent the machine learning model 1002 from memorizing training data from the training data set 1006. In other words, the machine learning model 1002 fits the training data set 1006, but the predictive performance of the machine learning model 1002 is not acceptable. Regularization helps the machine learning system 1000 avoid this overfitting/memorization problem by adjusting extreme weight values of the features 1008. For example, a feature that has a small weight value relative to the weight values of the other features in the training data set 1006 can be adjusted to zero.

The machine learning system 1000 can determine model accuracy after training by using one or more evaluation data sets 1010 containing the same features 1008' as the features

1008 in the training data set 1006. This also prevents the machine learning model 1002 from simply memorizing the data contained in the training data set 1006. The number of evaluation passes made by the machine learning system 1000 can be regulated by a target model accuracy that, when reached, ends the evaluation process and the machine learning model 1002 is considered ready for deployment.

After deployment, the machine learning model 1002 can perform a prediction operation ("prediction") 1014 with an input data set 1012 having the same features 1008" as the features 1008 in the training data set 1006 and the features 1008' of the evaluation data set 1010. The results of the prediction 1014 are included in an output data set 1016 consisting of predicted data. The machine learning model 1002 can perform other operations, such as regression, classification, and others. As such, the example illustrated in FIG. 10 should not be construed as being limiting in any way.

Based on the foregoing, it should be appreciated that aspects of detecting and mitigating drive-by home WI-FI hijack attacks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A war driving activity correlation system comprising:
   a processor; and
   a memory comprising instructions that, when executed by the processor, cause the processor to perform operations comprising
      obtaining a first report from a first home gateway system associated with a first home premises and obtaining a second report from a second home gateway system associated with a second home premises, wherein the first report from the first home gateway system identifies a suspicious device attempting to connect to a first WI-FI network provided, at least in part, by the first home gateway system, and wherein the second report from the second home gateway system identifies the suspicious device attempting to connect to a second WI-FI network provided, at least in part, by the second home gateway system,
      determining, based at least in part upon the first report and the second report, a route of an attacker who uses the suspicious device attempting to connect to the first WI-FI network provided, at least in part, by the first home gateway system and the second WI-FI network provided, at least in part, by the second home gateway system, wherein the route of the attacker who uses the suspicious device is through a neighborhood associated with the first home premises and the second home premises, generating instructions to deny probe requests from the suspicious device, and
      sending the instructions to a third home gateway system associated with a third home premises associated with the neighborhood.

2. The war driving activity correlation system of claim 1, wherein the instructions comprise the route, and wherein the operations further comprise sending the instructions to the first home gateway system and the second home gateway system.

3. The war driving activity correlation system of claim 2, wherein the instructions further comprise a mitigation action to be performed by the first home gateway system, the second home gateway system, and the third home gateway system.

4. The war driving activity correlation system of claim 3, wherein the mitigation action comprises blacklisting a media access control address associated with the suspicious device.

5. The war driving activity correlation system of claim 4, wherein the mitigation action is determined based upon a policy.

6. A method comprising:
   obtaining, by a war driving activity correlation system comprising a processor, a first report from a first home gateway system associated with a first home premises and obtaining a second report from a second home gateway system associated with a second home premises, wherein the first report from the first home gateway system identifies a suspicious device attempting to connect to a first WI-FI network provided, at least in part, by the first home gateway system, and wherein the second report from the second home gateway system identifies the suspicious device attempting to connect to a second WI-FI network provided, at least in part, by the second home gateway system;
   determining, by the war driving activity correlation system, based at least in part upon the first report and the second report, a route of an attacker who uses the suspicious device attempting to connect to the first WI-FI network provided, at least in part, by the first home gateway system and the second WI-FI network provided, at least in part, by the second home gateway system, wherein the route of the attacker who uses the suspicious device is through a neighborhood associated with the first home premises and the second home premises;
   generating, by the war driving activity correlation system, instructions to deny probe requests from the suspicious device, and
   sending, by the war driving activity correlation system, the instructions to a third home gateway system associated with a third home premises associated with the neighborhood.

7. The method of claim 6, wherein the instructions comprise the route, and wherein the method further comprises sending, by the war driving activity correlation system, the instructions to the first home gateway system and the second home gateway system.

8. The method of claim 7, wherein the instructions further comprise a mitigation action to be performed by the first home gateway system, the second home gateway system, and the third home gateway system.

9. The method of claim 8, wherein the mitigation action comprises blacklisting a media access control address associated with the suspicious device.

10. The method of claim 9, wherein the mitigation action is determined based upon a policy.

11. A computer-readable storage medium comprising computer-executable instructions for a war driving activity correlation system that, when executed by a processor, cause the processor to perform operations comprising:

obtaining a first report from a first home gateway system associated with a first home premises and obtaining a second report from a second home gateway system associated with a second home premises, wherein the first report from the first home gateway system identifies a suspicious device attempting to connect to a first WI-FI network provided, at least in part, by the first home gateway system, and wherein the second report from the second home gateway system identifies the suspicious device attempting to connect to a second WI-FI network provided, at least in part, by the second home gateway system;

determining, based at least in part upon the first report and the second report, a route of an attacker who uses the suspicious device attempting to connect to the first WI-FI network provided, at least in part, by the first home gateway system and the second WI-FI network provided, at least in part, by the second home gateway system, wherein the route of the attacker who uses the suspicious device is through a neighborhood associated with the first home premises and the second home premises;

generating instructions to deny probe requests from the suspicious device; and sending the instructions to a third home gateway system associated with a third home premises associated with the neighborhood.

12. The computer-readable storage medium of claim 11, wherein the instructions comprise the route, and wherein the operations further comprise sending the instructions to the first home gateway system and the second home gateway system.

13. The computer-readable storage medium of claim 12, wherein the instructions further comprise a mitigation action to be performed by the first home gateway system, the second home gateway system, and the third home gateway system.

14. The computer-readable storage medium of claim 13, wherein the mitigation action comprises blacklisting a media access control address associated with the suspicious device.

15. The computer-readable storage medium of claim 14, wherein the mitigation action is determined based upon a policy.

* * * * *